Feb. 3, 1948.    W. T. STEPHENS    2,435,244
HYDRAULIC CLUTCH AND FINAL DRIVE SHAFT UNIT FOR TRACTOR VEHICLES
Filed May 8, 1943    5 Sheets-Sheet 1

Inventor
WILLIAM T. STEPHENS
By Leech & Radue
Attorneys

Feb. 3, 1948. W. T. STEPHENS 2,435,244
HYDRAULIC CLUTCH AND FINAL DRIVE SHAFT UNIT FOR TRACTOR VEHICLES
Filed May 8, 1943 5 Sheets-Sheet 4

Fig. 5.

Inventor
WILLIAM T. STEPHENS
By Leech & Radue
Attorneys

Patented Feb. 3, 1948

2,435,244

UNITED STATES PATENT OFFICE 2,435,244

HYDRAULIC CLUTCH AND FINAL DRIVE SHAFT UNIT FOR TRACTOR VEHICLES

William T. Stephens, Cleveland, Ohio, assignor to Hydraulic Control Engineering Company, Cleveland, Ohio, a corporation of Ohio Application May 8, 1943, Serial No. 486,241

15 Claims. (Cl. 180—75)

This invention relates to hydraulic equipment for vehicles of the type making use of changes in the relative speeds of the driving wheels or tracks for the purpose of steering or for assisting in the steering.

More particularly the invention relates to hydraulic types of clutching means adapted to be interposed between the driving wheels or tracks of tractor type vehicles and the source of power whereby one or both wheels or tracks may be fully or partially coupled or decoupled for driving, steering or stopping of the vehicle.

It is a general object of the present invention to provide novel and improved hydraulic clutch mechanisms for individually or jointly controlling the association of power with one or both of the ground engaging driving means of a vehicle.

An important object of the invention consists in the interposition, between the driving and driven means, of the associated elements of balanced dual hydraulic pumps for circulating liquid in a closed circuit under the control of manually operable valves arranged for varying the degree of resistance to movement of the pumps from substantially zero to practically infinity whereby any desired degree of slippage may be effected between the driving and driven means.

Another object of the invention consists in the provision of a novel hydraulic clutch for interposition between the driving and driven means of a vehicle and which is composed of self-contained hydraulic pumps and valved fluid circuits.

An important feature of one embodiment of the invention consists in the arrangement of a common internal-external gear for cooperation with independent pinions to provide a pair of symmetrically disposed fluid pumps all arranged within a housing rotatable through the gear by the driving means for the vehicle.

An important feature of another embodiment of the invention resides in the arrangement of a central pinion cooperating with a pair of symmetrically disposed pump gears housed within a chamber rotatable with the final drive for vehicle.

A still further important feature of the invention consists in the arrangement of a hydraulic pump type clutch centrally within a driving wheel or sprocket whereby the same may be clutched to or separated from a coaxially disposed drive shaft.

Other and further objects and features of the invention, including details of construction, will be more apparent to those skilled in the art on a consideration of the accompany drawings and following specification, wherein are disclosed three exemplary embodiments, with the understanding that such modifications and combinations thereof may be made such as fall within the scope of the appended claims without departing from the spirit of the invention.

In said drawings:

Fig. 6 is a view taken on line 6—6 of Figure 5.

Tractors and like vehicles, including various military types, driven either by large wheels or endless tread type tracks are customarily steered by varying the relative rates of speeds of rotation of the rear wheels or the sprockets driving the tracks. There are several schools of thought as to the best manner of accomplishing this purpose. Some manufacturers prefer to use a differential between the rear wheels or drive sprockets, to drive this by worm or bevelled gears from the engine and to provide for each wheel what are known as "steering brakes." If the brake is applied to one wheel it may be slowed down so that the superior speed of the other causes the vehicle to turn about the wheel moving at the slower speed. For maximum rate of turn the one wheel may be locked and all speed imparted to the other. In addition to the steering brakes others for the purpose of stopping or slowing the vehicles on grades must also be provided. This duplication of brakes plus the complexity of the differential makes a costly vehicle and one which is held by some to provide inferior operation and manipulation.

In a second form of final drive the rear axle is solid so that both ends always rotate at the same speed. It may be driven from the engine through reduction gears of any suitable type. The vehicle driving wheels or sprockets are clutched to the respective ends of the live axle by mechanical clutches of the plate or disk type and one or the other or both are released to achieve steering or stopping. This arrangement provides superior manipulating qualities under many conditions because one wheel does not speed up when the other is declutched as with a differential arrangement but the clutch devices themselves are cumbersome, space consuming and costly. They do not operate at the high speed of the engine drive shaft and hence must be greater in diameter and have a larger number of plates than the usual main clutch with which most of these vehicles are also equipped.

Both of the types of tractor drives just described require considerable service, the first to maintain the steering brakes in adjustment and properly lined with friction material and the second to maintain the wheel clutches in adjustment. Both types require the expenditure of considerable manual effort for their manipulation.

In accordance with the present invention an improvement on the second form of final drive is achieved by substituting simple, self-contained, gear pump type hydraulic clutches for the cumbersome mechanical clutches. These devices require substantially no maintenance, are always in adjustment, occupy a minimum of space, are light in weight, and can be operated with a very minimum of energy exertion as compared with the great application of manual power which is necessary for the handling of the large mechanical clutches, normally used, or for the application of wheel brakes of the steering type. The only power required for operating the devices of the present invention is that necessary for the manipulation of a pair of simple valve devices. This makes it very simple to steer the vehicle either by completely stopping the drive on one side or just reducing its speed. Under this latter condition the action is extremely smooth since there can be no grabbing, chattering or jerking of the hydraulic mechanism forming the clutch.

Figure 1:
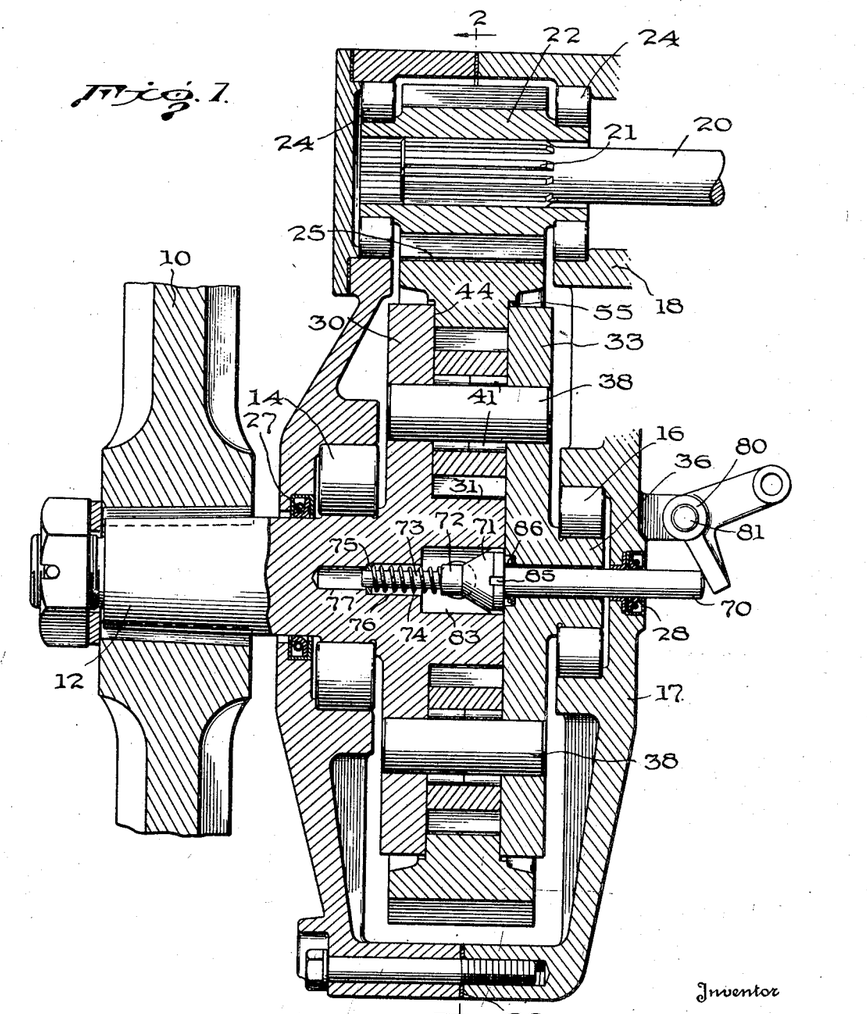
Fig. 1 is an axial section through a hydraulic driving and clutching means and its associated parts constructed in accordance with one embodiment of this invention.

Referring now to Fig. 1 for a general understanding of the invention there is shown at 10 a fragment of one of the drive wheels of a wheel type tractor or of one of the sprockets for driving the tread of a track laying type. This is securely keyed and bolted to a stub shaft 12 having bearings at 14 and 16 in any convenient form of housing 17 for the hydraulic clutch mechanism about to be described. This housing is suitably attached to the frame of the vehicle so that it is fixed in relation to the sleeve 18 for the transverse live axle 20. This live axle 20 may extend across as a unit between the two rear wheels and be driven by a simple worm or bevel gear drive or through a more complex gear reduction which may even involve a differential gear if desired. The splined end 21 of the live axle 20 mounts a drive pinion 22 having bearings 24 in the housing and meshing with corresponding teeth on a gear member or so-called bull-gear 25 which in turn drives the shaft 12 through the clutch device of this invention.

The housing 17 is centrally divided as at 26 for convenience in assembling the interior mechanism and may be attached to or a portion of the sleeve 18 for the drive shaft and pinion. It is equipped at the joint with a gasket as shown and held together by suitable bolts such as the one indicated at the bottom. The housing should be fluid tight solely for the purpose of retaining the lubricant for the several bearings and the pinion and bull-gears. For this purpose appropriate packings are indicated at 27 where the drive stub passes through the housing and at 28 where the valve actuating rod, later to be described, extends from the opposite side. The housing should be vented to the atmosphere as is usual to prevent pressure build-up with increase in temperature.

Figure 2:
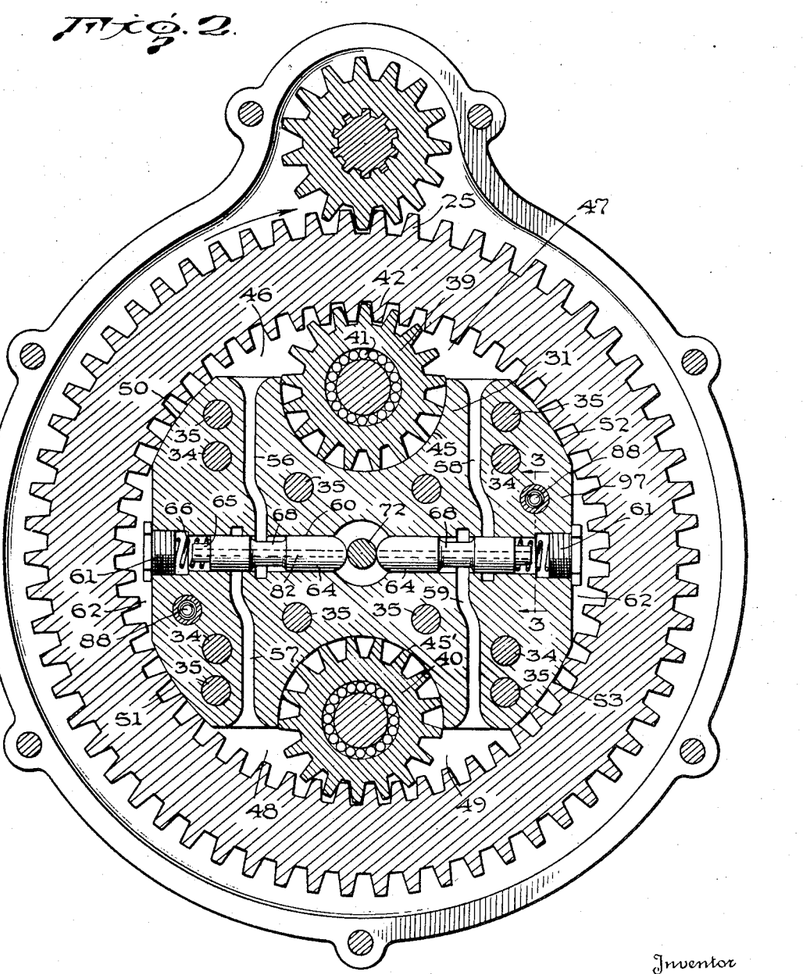
Fig. 2 is a transverse section taken on line 2—2 of Fig. 1 looking in the direction of the arrows.

The stub shaft 12 is preferably formed integral with the main portion of the combined frame and casing for the hydraulic clutch assembly. This portion includes the circular disk 30 and the central hub-like excrescence 31 of irregular conformation as seen in Figure 2. A complementary plate 33 is attached against the face of the central portion 31 and held in alignment with disk 30 by appropriate dowels 34. The parts are securely bolted together by through bolts 35 with recessed heads and nuts (not shown). The plate 33 has projecting centrally therefrom the stub axle 36, journalled in the bearing 16 at the inner side of the housing. The assembly just described is rotatable in the main housing and is centrally disposed of the bull-gear which is carried thereby as will be described.

A pair of transverse axle pins 38 equally spaced on a diameter from the axis of rotation of the disks 30 and 33 pass through and are securely attached to these disks and form spindles for the identical pump gears 39 and 40 whose end faces have a close running fit with the inner faces of the disks 30 and 33. Anti-friction bearings 41 may be interposed between the gears and their spindles 38. The two pump gears 39 and 40 are appropriately toothed for and mesh with the internal teeth 42 cut in the inner periphery of the bull-gear 25. This bull-gear which is of the ring or annular type has a wide face where it meshes with the pinion 22 but is reduced as at 44 to have parallel sides spaced for a close running fit with and between the inner faces of the disks 30 and 33. This internal gear portion of the bull gear member forms a closure for a chamber between the two disks for housing the pump gears. This chamber is adapted to be filled with oil. The internal teeth 42 are of the same length axially as the teeth on the pump gears 39 and 40. In fact, two gear pumps are formed by the meshing of these pump gears with the internal gear which is driven by the bull gear.

If a hydraulic lock can be effected so that rotation of the pump gears in respect to the internal gear is prevented, then the sprocket or wheel 10 can be driven by the pinion 22 with no slippage. Conversely if the pinions 39 and 40 can be permitted to rotate freely then the wheel 10 may remain stationary while the pinion continues to rotate.

In order to achieve these results the portion integral with disk 30 and centrally disposed between the companion disks takes the peculiar configuration illustrated in Figure 2, which includes the pockets 45 and 45' generally semi-cylindrical in shape and having arcuate walls adjusted for close running fits with the tips of the teeth of the pump gears 39 and 40. Adjacent and on each side of the intersection of each pump gear and the internal gear the part 31, which otherwise generally fills the space inside of the ring gear, is cut away to provide a pair of generally triangular compartments numbered respectively 46 and 47 for the uppermost gear and 48 and 49 for the lower one. Between these pockets the periphery of part 31 is solid for the arcuate segments indicated by 50, 51, 52 and 53. These peripheral parts have a close running fit with the tips of the teeth of the internal gear and form liquid seals for and between the pumps. They also provide the bearing surfaces and centralizing means for the ring gear, although if desired bearing surfaces may be provided as at 55 between the outer circular peripheries of the disks 30 and 33 and the shoulder where the bull gear widens as shown. Likewise sealing means may be provided at 55 to prevent leakage of oil from between the disks 30 and 33 which serve as the sole confining means for the hydraulic fluid circulated by the two pumps just described.

It will be seen that if, as seen in Figure 2, the vehicle wheel is stationary and the pinion 22 is driven in such a manner as to provide clockwise rotation for the bull-gear, that the chambers 46 and 49 become high pressure chambers in which oil accumulates while the chambers 47 and 48 become low pressure chambers and exert a suction on the oil. This will be appreciated when it is noted that the oil carried between the teeth of the internal and pump gears is brought together and displaced in the chambers 46 and 49 by the intermeshing of the gear teeth.

In order to provide a circuit for the oil to flow between the pumps in a closed loop and subject to regulation the channels 56 and 57 are arranged at the left hand side extending respectively from pockets 46 and 48 and channels 58 and 59 at the right side of part 31 and extending respectively from pockets 47 and 49. These may be cored or otherwise formed in block 31 so that they overlap each other in the pairs noted in and around the diametrical bore 60 along which they are spaced. This bore extends clear through the block 31 and is plugged at the ends by screw plugs 61, the hexagonal heads of which rest on gaskets and are accommodated in the pockets 62 provided for the purpose so that they have clearance from the internal gear teeth.

A pair of identical valves 64 are arranged one in either end of the cylindrical bore 60. They comprise cylindrical rods having semi-spherical inner ends and reduced outer ends 65 to centralize the helical springs 66 interposed between them and the plugs 61 for the purpose of pressing the valves toward the center. Each of these valves is of the spool type and therefore has a portion 68 of reduced diameter which normally communicates with one of the passages 56 or 59 of each pair. The companion passages 57 and 58 are cut off from them because of the close fits of the full diameters of the outer ends of the valves.

If the valves 64 are pressed apart, so that their reduced diameters span the passages 56—57 and 58—59 then full communication is provided for oil to flow from the high pressure chamber 46 of gear 39 to the low pressure chamber 48 of gear 40 and from the high pressure chamber 49 of gear 40 to the low pressure chamber 47 of gear 39 in a closed series circuit. In this condition the wheel or sprocket will not be driven since there is no resistance to rotation of the pump gears and the bull-gear merely rotates about them freely under the action of the drive pinion.

If the valves 64 are allowed to assume the position indicated in Figure 2, however, no flow of fluid, attempted to be delivered by the pumps, is permitted and hence the pump gears 39 and 40 are locked in position against rotation. When this occurs the rotation of the bull-gear under the action of its pinion carries the spindles of the pump gears around and hence drives the assembly composed of disks 30 and 33, which in turn drive the stub axle 12 and the drive wheel 10. Obviously any intermediate positioning of the valves will permit various restricted quantities of fluid to flow in the circuit between the pumps so that various reduced speeds of drive of the wheels in respect to the live axle 20 may be obtained.

Each wheel or sprocket is adapted to have its pump control valves manipulated by means of a plunger 70 extending concentrically through the inner wall of the main housing, the hub 36, the block 31 and partially into the stub axle 12. The inner end of this plunger has an enlarged conical head 71 supporting a reduced cylindrical portion 72 from which extends a pin 73 forming a pilot for the helical spring 74 abutting against washer 75 at the shoulder between the spring housing bore 76 and the small bore 77 providing clearance for the pin when projected. The opposite end of the spring bears against the head of the portion 72. It will be seen that the spring urges the plunger, to the position shown, where the semi-spherical heads of the valves 64 are caused to bear on the cylindrical part 72, under the urge of the springs 66 to hold the valves in the closed position. If the plunger is moved to the left, as viewed in Figure 1, the conical portion 71 engages the heads of the valves and separates them an amount determined by the distance the plunger is moved, so that the valves may be manipulated to any position desired. A bell crank lever 80 pivoted at 81 to the housing 17 provides a convenient means for manipulating the plunger 70 and can be connected to appropriate hand or foot levers for steering the vehicle. Normally a separate lever is provided for each wheel, permitting them both to be freed, both locked to the drive shaft or to be individually released from the shaft wholly or in part.

In order that oil does not become trapped behind the valves due to slight leakage past them, and thus serve to lock them against opening, each is longitudinally drilled for its full length as seen at 82, connecting the pockets behind them which house the springs with the enlarged bore 83 in which the cone 71 is arranged to move. The cone has its cylindrical periphery guided in the walls of this bore 83 and has this periphery serrated or slotted as at 85 to prevent it trapping any of the oil behind the same.

In addition to the seal 28 at the outer end of the plunger 70, which serves to prevent the loss of gear lubricant, there is a seal 86 which prevents the loss of oil which may leak into the central compartment 83 from the hydraulic casing.

Figure 3:
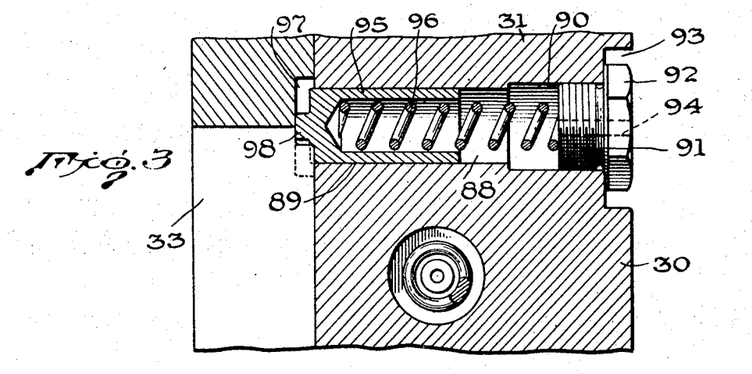
Fig. 3 is a fragmentary section on an enlarged scale of liquid expansion compensating means, the same being taken on line 3—3 of Figure 2.

The relatively small amount of oil which fills all of the spaces within the chamber formed by the disks 30 and 31 and the internal gear is closely confined, preferably without any air pocket and some means must be provided to accommodate its changes in volume with changes in temperature. As shown two expansion plugs are provided for the purpose but any additional number may be used where necessary. These plugs are seen in Figure 2 at 88 but are shown in greater detail in Figure 3. Here it will be seen that the block 31 and integral disk 30 is provided with a cylindrical bore 89 extending entirely through it from its junction with the disk 33. It is counter-bored at 90 and threaded to receive the threaded inner end of a screw plug 91 the hexagonal head 92 of which is received in a further counter-bore 93. The plug is longitudinally bored as at 94 to prevent fluid lock. A piston 95 is reciprocably mounted in the bore 89, and is hollowed at its rear to house a portion of the helical spring 96 the opposite end of which abuts the inner face of the screw plug, tending to force the piston 95 to the left. The bore 89 at its left end communicates with a channel 97 in the face of disk 33, which communicates with the pocket 62 forming the clearance for the head of the plug 61 at the end of the valve bore. A protuberance 98 from the end of the piston 95 prevents the same from bottoming in the channel. It will be seen at any increase in volume of the oil in the pump system will press the piston 95 to the right against the action of the strong helical spring 96 and will provide space for this increased volume. Upon cooling the oil will be returned to the pump circuit by means of the spring.

Figure 4:
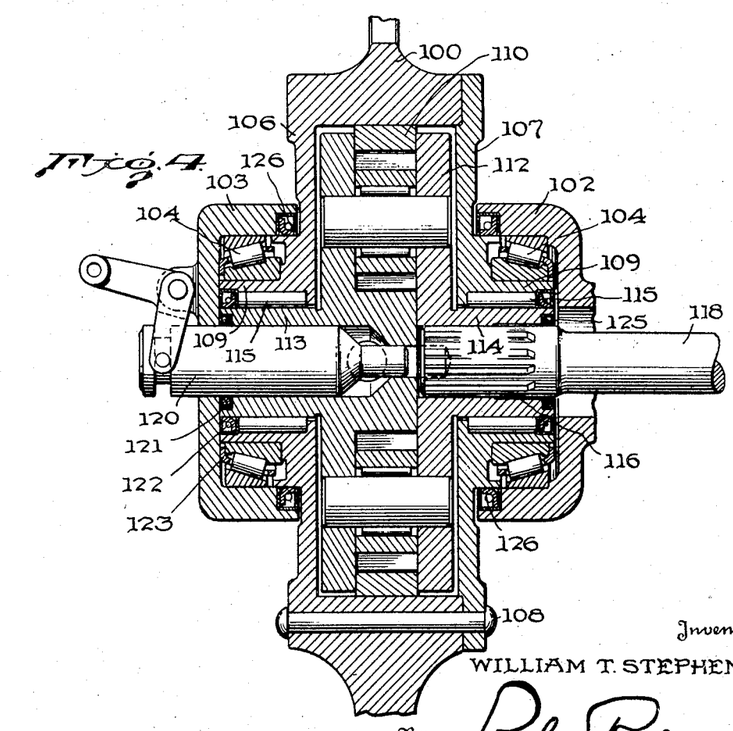
Fig. 4 is a view, similar to Figure 1, but showing a different arrangement of the power input and take-off arrangements whereby the clutch is centrally housed in a wheel or sprocket and driven from a concentric shaft.

In the embodiment illustrated in Figure 4 the hydraulic clutch and drive mechanism is entirely centrally arranged within the drive wheel or sprocket 100, rather than being associated with the same through a stub axle as in the previous embodiment. Furthermore there is no gear reduction in this embodiment, as accomplished by the pinion 22 and bull-gear 25 of the earlier form, the drive shaft being concentrically disposed and directly attached to the hydraulic assembly.

In this present arrangement suitable axle housing parts 102 and 103, appropriately attached to the vehicle, carry combination radial and thrust bearings 104 for supporting the central portion of the wheel 100 which is formed as a hollow cylindrical housing, composed of the box portion 106 which supports the wheel spokes or web, and the cover plate 107 secured thereto as by rivets or bolts 108. This housing has the integral, tubular, axial extensions 109 which carry the inner races for the bearings 104, whereby the wheel is properly supported from and journalled in the axle housings.

The hydraulic mechanism in this construction is identical with that in the previous embodiment and need not be described here further than to say that the internal gear 110 is appropriately secured in a fixed relation to the inner wall of the chamber formed at the center of the wheel. This chamber also houses the casing 112 which carries the pump gears and associated parts already described in connection with Figs. 1, 2 and 3. This casing 112 has integral axial extensions 113 and 114 between which and the annular extensions 109 from the wheel chamber are arranged roller bearings 115, which support the hydraulic mechanism and permit relative movement of the same in respect to the wheel. The right hand bearing extension 114 is appropriately drilled centrally and grooved to cooperate with the splined end 116 of the live axle 118.

It will be noted that in this construction the hydraulic mechanism is directly driven by the live axle and in turn drives the internal gear 110 when the pumps are locked. This is the reverse of the first embodiment where the internal gear is driven through the pinion and bull ring and the hydraulic mechanism rotates the stub axle carrying the wheel or sprocket.

Since the inner face of the axle housing which carries the whole mechanism just described is centrally perforated to admit the live axle, the plunger 120 which controls the valves, which are of the same construction as in the first embodiment, extends through the opposite or outer side of the housing. It is shown as of the maximum diameter throughout its length but otherwise functions in the same manner as previously described. It is maintained oil tight by means of a seal 121. Various other seals are shown in this construction, one set or pair at 122 for preventing loss of bearing lubricant, another at 123 for the same purpose and a single one at 125 to prevent loss of hydraulic fluid longitudinally along the live axle. There are also seals 126 provided to prevent leakage of bearing lubricant between the axle housing and the wheel center.

This construction, as just described, occupies the minimum of space and is particularly valuable for high speed track laying types of drives such as used in reconnaissance cars, half track trucks and the like where considerable gear reduction is not required.

Figure 5:
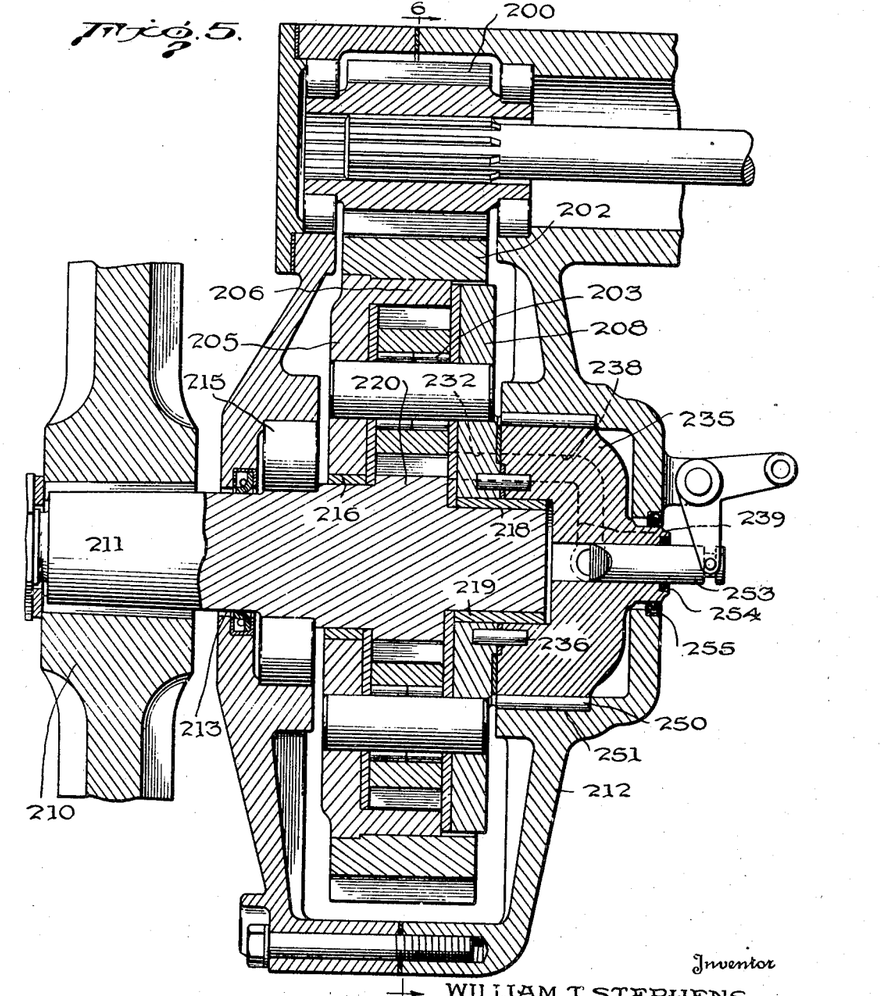
Fig. 5 is a view, similar to Figure 1, of a further embodiment of the invention using a central gear or pinion for cooperation with the two pump gears.
Figure 6:
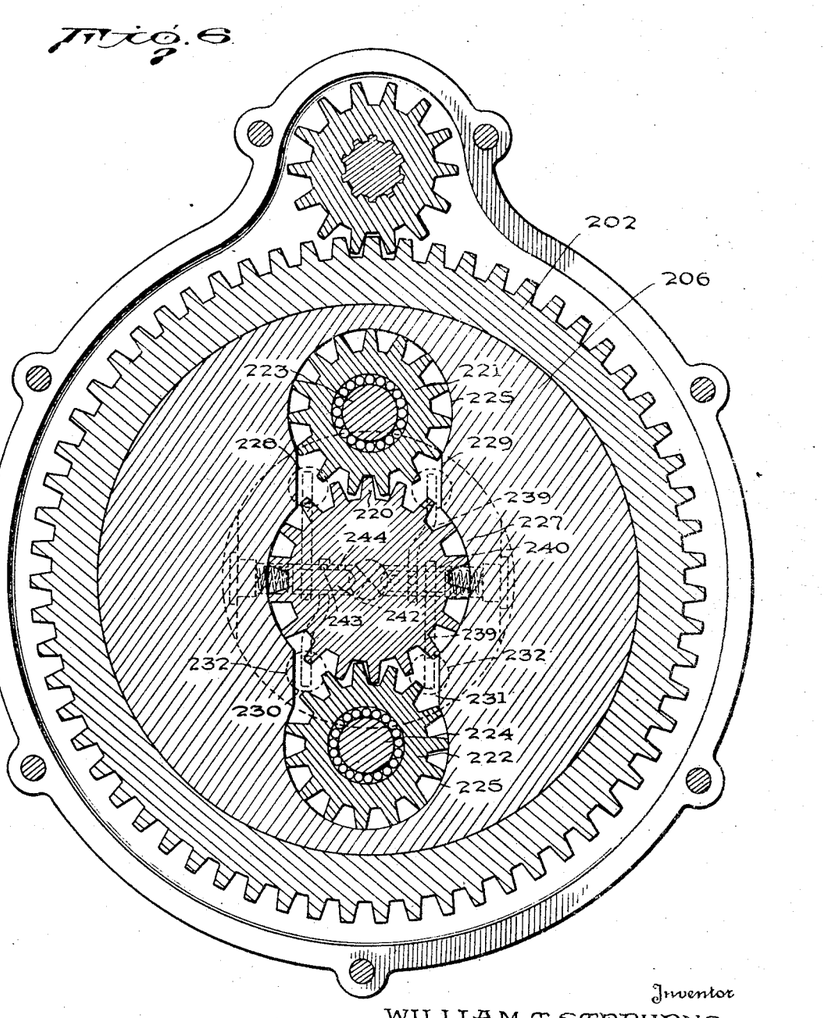

In Figs. 5 and 6 is shown an embodiment of the invention which in general disposition of parts is substantially the same as the embodiment of Fig. 1. It will therefore be necessary to describe only the differences. In this construction the pinion 200 drives the bull gear 202 which is permanently and rigidly attached to the periphery of the hydraulic mechanism assembly generally indicated by the reference character 203.

This hydraulic mechanism assembly includes a casing formed of the disk 205 and the integral block 206 of circular outline as seen in Figure 6. The cover plate 208 is attached to the same by appropriate dowels and bolts (not shown) and the bull gear 202 is mounted in any desired manner or can be formed integral, if desired, with the part 206.

The sprocket or drive wheel 210 is carried on a stub axle 211 which extends to the inside of the main housing 212 through a packed opening 213 and is supported therefrom by a main bearing 215. The axle then passes through the end plate or disk 205 of the hydraulic mechanism where it is equipped with a suitable bronze bushing 216 permitting relative motion between the two parts. The far end of the axle is reduced in diameter, as at 218, and journalled in a bronze bushing 219 carried by the hydraulic mechanism cover plate 208. The axle is thus free to rotate in respect to the hydraulic casing and its central portion is enlarged in diameter and toothed to form a gear 220 which cooperates with the pump gears 221 and 222 journalled respectively on pins 223 and 224 extending between the two side plates of the hydraulic casing. The two pump gears fit in bores 225 in part 206, the walls of which are closely engaging with the tips of the teeth to prevent leakage. The part 206 is also centrally drilled as at 227 to provide close clearance for the tips of the teeth of the hub gear 220.

The bores 225 both intersect the bore 227 and the intersections are cut away to provide the triangular enlargements or oil pockets 228, 229, 230 and 231, forming in pairs the respective high and low pressure chambers for the two pumps, constructed by the engagement of the gears 221 and 222 with the central gear 220. The closing disk 208, which covers the hydraulic casing, is provided with the four bores 232, one intersecting or communicating with each of the triangular high and low pressure chambers for the several pumps. These bores register with continuations of the same in the valve cap member 235, which is secured centrally against the disk 208, as by dowels 236 and other fastening means (not shown).

This cap is bored to receive the inner or stub end of the axle and a portion of the bronze bushing 219 forming its bearing whereby the axle is mounted for rotation relative to the whole hydraulic assembly. The extensions of the bores 232 are shown at 238 as being cored out of the cap 235. They turn at right angles as at 239 to form the pairs of overlapping passages which intersect the transverse cylindrical bore 240 housing the pair of valves.

The valves and their cooperating mechanism may be identical with those described in connection with the first embodiment but a slight modification is illustrated in Figure 6. Instead of the valves being of the spool type and having a cutaway or reduced portion to provide communication between the overlapped passages 239, they are preferably provided with a longitudinal bore 242, closed at the ends and arranged with a pair of radial ports 243 and 244, spaced apart longitudinally the same as the distance between the overlapped passages 239. It will be seen that when the valves are moved radially outwardly that these valve ports will register with the passages and permit flow through the valve bores. This flow will be in a closed series circuit between the two pumps in the same manner as described in connection with the first embodiment. Any appropriate degree of throttling of the flow can be effected as previously described.

It will be seen that this construction provides a pair of gear pumps comprising two pump gears and a master gear all housed in the same metal block. Each of the pump gears has a sealing periphery of well over 225 degrees because of its close fit in its bore 225. The main gear has seals between the respective high and low pressure compartments of adjacent pump gears, each of which is about 90 degrees in extent so that substantially no leakage is to be expected, whereby, when the valves are fully closed there will be substantially no relative movement between the gear 220 on the axle of the drive wheel and the pump gears. Since the pump gears are now locked and constrained to move with the whole hydraulic housing they will be bodily rotated by the cooperation of the pinion with the bull-gear and will drive the sprocket or drive wheel with no lost motion. Any degree of lost motion or slippage can be obtained by adjustment of the valves to permit partial circulation of fluid in the series system between the two pumps.

To further aid in supporting the whole rotatable assembly in the axle housing, roller bearings 250 are arranged between the periphery of cap 235 and a counterbore 251 in the axle housing. Where the valve operating pin 253 extends out through the reduced end of the cap 235 a suitable packing 254 is provided and another packing 255 provides tightness between this reduced end and the main axle housing so that there will be no leakage of bearing and gear lubricant.

The construction just described is somewhat simpler to manufacture than that described in connection with the first embodiment and can be made somewhat less in diameter by reason of the gear pumps each being composed, in effect, of two spur gears. These are not quite so efficient as those composed of one spur gear and one internal gear as in the first embodiment of the invention because of the lesser areas of teeth in contact. Longer wear and less leakage may be expected from the pumps including the internal gear.

It will be seen that the devices of the present invention provide extremely small, simple, and cheap substitutes for the cumbersome plate clutches. Moreover they require much less effort to operate, need no adjusting and have almost no wearing parts, and these are continually lubricated.

Having thus described my invention, what I claim as new and desire to secure by Letters Patent of the United States is:

1. In a hydraulic unit for tractor-like vehicles, a final driving wheel part, a live axle part, a housing supported by the vehicle for a portion of each part, and means interposed between the said parts to drive one from the other with any desired degree of slippage, said means comprising a multiple hydraulic pump assembly fixed to one of said parts and including a single gear for each pump, means rotatably supporting said assembly in said housing, a single gear positioned for cooperation with said assembly pump gears for completing the pumps and arranged for movement with the other part, and valves carried by said assembly for adjusting the rate of liquid flow from the several pumps.

2. In a hydraulic unit for tractor-like vehicles, a final driving wheel part, a live axle part, a housing supported by the vehicle for a portion of each part, and means interposed between the said parts to drive one from the other with any desired degree of slippage, said means comprising a multiple hydraulic pump assembly fixed to one of said parts and including a single gear for each pump, means rotatably supporting said assembly in said housing, a single gear positioned for cooperation with said assembly pump gears for completing the pumps and arranged for driving connection with the other part, valves carried by said assembly for adjusting the rate of liquid flow from the several pumps and means extending through the housing coaxial with said driving wheel to operate said valves simultaneously.

3. In a hydraulic unit for tractor-like vehicles, a final driving wheel part, a live axle part, a housing supported by the vehicle for a portion of each part, and means interposed between the said parts to drive one from the other with any desired degree of slippage, said means comprising an axle for said driving wheel part journalled in said housing and having a gear thereon in the housing, a multiple hydraulic pump assembly journalled on said last mentioned axle and including pump gears meshing with said axle gear, means to rotate said assembly from said live axle and means for effecting varying degrees of resistance to the movement of said pump gears relative to said first gear.

4. In a hydraulic unit for tractor-like vehicles, a final driving wheel, a live axle and means interposed between the said wheel and axle to drive the former from the latter with any desired degree of slippage, said means being received in a housing supported by the vehicle, and comprising a multiple hydraulic pump assembly fixed to said wheel and including a gear for each pump, bearings interposed between the assembly and the housing, a single gear member concentric with the bearings for completing the pumps and arranged for movement by the live axle, and valves carried by said assembly for adjusting the rate of liquid flow from the several pumps.

5. The hydraulic unit as claimed in claim 4 in which the single gear member is an internal gear.

6. The hydraulic unit as claimed in claim 4 in which the single gear member is an internal gear, teeth formed on the exterior of said gear member and a pinion on said live axle meshing with said teeth.

7. In a hydraulic unit for tractor-like vehicles, a final driving wheel part, a live axle part and means interposed between the said parts to drive one from the other with any desired degree of slippage, said means comprising a multiple hydraulic pump assembly journalled to and within the said wheel part and including a gear for each pump, said live axle being directly connected to rotate said assembly, an internal gear fixed to said wheel part, said internal gear being in mesh with the said pump gears, and means to regulate the flow of liquid pumped by said gears.

8. In a hydraulic unit for tractor-like vehicles, a final driving wheel, a live axle and means interposed between the said wheel and axle to drive the former from the latter with any desired degree of slippage, said means being arranged in a housing supported by the vehicle, and including a multiple hydraulic pump assembly, including a gear for each pump, mounted for rotation in said housing, a cooperating single gear for completing the pumps arranged concentric with and for movement relative to said assembly, valves carried by said assembly for adjusting the rate of liquid flow from the several pumps, and means to individually drivingly associate the assembly and single gear with one each of the wheel and axle.

9. In a hydraulic unit for tractor-like vehicles, a final driving wheel part, a live axle part and means interposed between the said parts to drive one from the other with any degree of slippage, said means being arranged in a housing supported by the vehicle, and including a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing, an internal gear fitting between said discs and meshing with each of said pump gears for pumping cooperation therewith and means forming a driving connection between the other of said parts and said internal gear and means for effecting varying degrees of resistance to the relative movement of the gears of each pump.

10. In a hydraulic unit for tractor-like vehicles, a final driving wheel part, a live axle part and means interposed between the said parts to drive one from the other with any degree of slippage, said means being arranged in a housing supported by the vehicle, and including a hydraulic pump assembly including a drum-like hydraulic pump casing having spaced discs, means journalling said casing for rotation in said housing, a shaft on said driving wheel part extending into said housing and non-rotatively attached to the casing, a plurality of gear pumps, one gear of each pump being contained in said casing, an internal gear member fitting between said discs and meshing with each of said pump gears for pumping cooperation therewith, teeth on the external periphery of said internal gear member, means secured to the live axle part meshing with said teeth to drive the internal gear member and means to hydraulically block the said pumps in varying degree whereby the said casing is rotated by said means meshing with said teeth.

11. In a hydraulic unit for tractor-like vehicles, a final driving wheel part, a live axle part and means interposed between the said parts to drive one from the other with any degree of slippage, said means being arranged in a housing supported by the vehicle, and including a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing, an internal gear member fitting between said discs and meshing with each of said pump gears for pumping cooperation therewith, means forming a driving connection between the other of said parts and said internal gear member, each pump having a high pressure chamber and a low pressure chamber and a valve in said casing for controlling the rate of flow between said chambers.

12. In a hydraulic unit for tractor-like vehicles, a final driving wheel part, a live axle part and means interposed between the said parts to drive one from the other with any degree of slippage, said means being arranged in a housing supported by the vehicle, and including a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing, an internal gear member fitting between said discs and meshing with each of said pump gears for pumping cooperation therewith, means forming a driving connection between the other of said parts and said internal gear member, each pump having a high pressure chamber and a low pressure chamber, a passage connecting the high pressure chamber of each pump to the low pressure chamber of the adjacent pump and valves in said casing for controlling the flow in said passages.

13. In a hydraulic unit for tractor-like vehicles, a final driving wheel part, a live axle part and means interposed between the said parts to drive one from the other with any degree of slippage, said means being arranged in a housing supported by the vehicle, and including a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing, an internal gear member fitting between said discs and meshing with each of said pump gears for pumping cooperation therewith, a high and low pressure chamber for each pump, valves controlling the flow of liquid between said chambers, a common operator for all of said valves, said operator being coaxial with the internal gear, and means forming a driving connection between the other of said parts and said internal gear member.

14. In a hydraulic unit for tractor-like vehicles, a final driving wheel part, a live axle part and means interposed between the said parts to drive one from the other with any adjusted degree of slippage, said means being fitted in a housing supported by the vehicle, and comprising a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing and each having a portion of its periphery exposed at the surface thereof, an internal gear fitting between said discs, meshing with each of said pump gears for pumping cooperation therewith and having its teeth closely engaging the drum surface between pump gears to provide sealing, an inlet and outlet chamber for each pump gear, fluid circulating passages in said casing connecting said chambers, valve means adapted to control said passages, and a driving connection between the other of said parts and the said internal gear.

15. In a hydraulic unit for tractor-like vehicles, a final driving wheel part, a live axle part and means interposed between the said parts to drive one from the other with any adjusted degree of slippage, said means being fitted in a housing supported by the vehicle, and comprising a hydraulic pump assembly including a drum-like hydraulic pump casing having spaced discs, means journalling said casing for rotation in said housing, a shaft extending into said housing from one of said parts and non-rotatively attached to the casing, a plurality of gear pumps, one gear of each pump being contained in said casing and each having a portion of its periphery exposed at the surface thereof, an internal gear drivingly connected to the other part, fitting between said discs, meshing with each of said pump gears for pumping cooperation therewith and having its teeth closely engaging the drum surface between pump gears to provide sealing, an inlet and outlet chamber for each pump gear, fluid circulating passages in said casing connecting said chambers, a plunger valve radially disposed in said casing for each pump, said plungers being biased toward the center to close off communication between said chambers, and a plunger coaxial with said casing and adapted to control all of said valves simultaneously.

WILLIAM T. STEPHENS.

REFERENCES CITED

The following references are of record in the file of this patent:

UNITED STATES PATENTS

| Number | Name | Date |
|---|---|---|
| 2,174,344 | Sinderson | Sept. 26, 1939 |
| 2,332,310 | Durham | Oct. 19, 1943 |
| 1,819,677 | Galanti | Aug. 18, 1931 |
| 1,442,555 | Best | Jan. 16, 1923 |
| 2,151,615 | Potter | Mar. 21, 1939 |
| 1,761,255 | Dunn | June 3, 1930 |
| 2,095,393 | Miller | Oct. 12, 1937 |
| 1,458,565 | Weston | June 12, 1923 |
| 2,086,889 | Anderson, Jr. | July 13, 1937 |
| 2,221,705 | Glynn, Jr. | Nov. 12, 1940 |
| 2,257,108 | Cornwell | Sept. 30, 1941 |
| 2,281,292 | Hoover | Apr. 28, 1942 |
| 2,301,308 | Melville | Nov. 10, 1942 |
| 2,311,237 | Loveday | Feb. 16, 1943 |
| 2,287,498 | Scofield | June 23, 1942 |
| 1,985,146 | Campbell | Dec. 18, 1934 |

FOREIGN PATENTS

| Number | Country | Date |
|---|---|---|
| 7,471 | France | June 4, 1907 |
| 408,584 | Great Britain | Apr. 10, 1934 |